United States Patent [19]

Lewis

[11] Patent Number: 5,704,175

[45] Date of Patent: Jan. 6, 1998

[54] MULTI-CHANNEL RACEWAY FOR ELECTRIC WIRES, CABLES AND OTHER ELONGATED UTILITY LINES

[75] Inventor: Graham L. Lewis, Beaconsfield, Canada

[73] Assignee: H.G. Kalish Inc., Pointe-Claire, Canada

[21] Appl. No.: 805,903

[22] Filed: Mar. 4, 1997

Related U.S. Application Data

[63] Continuation of Ser. No. 408,835, Mar. 23, 1995, abandoned.

[51] Int. Cl.⁶ .................................................. E04B 2/00
[52] U.S. Cl. .......................... 52/288.1; 52/287.1; 174/48
[58] Field of Search .............................. 52/290, 288.1, 52/287.1, 220.7, 220.1, 49, 66, 101; 174/48, 99 R, 72 C, 72 R, 95; 439/113, 114, 215

[56] References Cited

U.S. PATENT DOCUMENTS

| | | |
|---|---|---|
| 3,461,220 | 8/1969 | Hukin . |
| 3,551,584 | 12/1970 | Rose . |
| 3,692,920 | 9/1972 | Santarelli . |
| 3,721,762 | 3/1973 | Gooding . |
| 3,786,171 | 1/1974 | Shira . |
| 3,844,078 | 10/1974 | Jensen et al. ............... 52/220.1 X |
| 4,145,853 | 3/1979 | Bridwell . |
| 4,216,823 | 8/1980 | Keldmann . |
| 4,407,101 | 10/1983 | Propst et al. ............... 52/220.7 X |
| 4,905,433 | 3/1990 | Miller ......................... 52/220.1 X |
| 4,982,536 | 1/1991 | Muhlethaler . |
| 5,024,614 | 6/1991 | Dola et al. .................. 52/288.1 X |
| 5,086,194 | 2/1992 | Bruinsma . |
| 5,274,972 | 1/1994 | Hansen . |

FOREIGN PATENT DOCUMENTS

| | | | |
|---|---|---|---|
| 0038433 | 8/1973 | Australia .................... | 52/288.1 |
| 3022006 | 12/1981 | Germany ..................... | 52/220.1 |

Primary Examiner—Lanna Mai
Attorney, Agent, or Firm—Swabey Ogilvy Renault

[57] ABSTRACT

A multi-channel wireway in the form of an elongated housing includes a retaining strip and a cover removably mounted to the retaining strip. The retaining strip includes a base of L-shaped profile and a series of vertically spaced and horizontally oriented parallel elongated shelves which define a number of compartments adapted to separately receive therein different types of electric cables and wires and other utility lines such a compressed air lines. The compartments are open-ended towards the cover and are thus accessible when the cover is removed. An elongated closure plate is removable mounted to the open side of at least one compartment, such as the compartment containing the power cables, to deny direct access thereto even when the cover is removed. The shelves have various depths to provide better access thereto. The cover is gravity-supported in a closed position thereof by the retaining strip. The overall configuration of the wireway eliminated openings through which spilled substances could access the inside of the wireway with a view of facilitating cleaning operations. The cables can enter and exit the wireway trough connections provided in the retaining strip and an inverted U-shaped cover is provided exteriorly of the retaining strip to protect these connections from spilled substances.

14 Claims, 3 Drawing Sheets

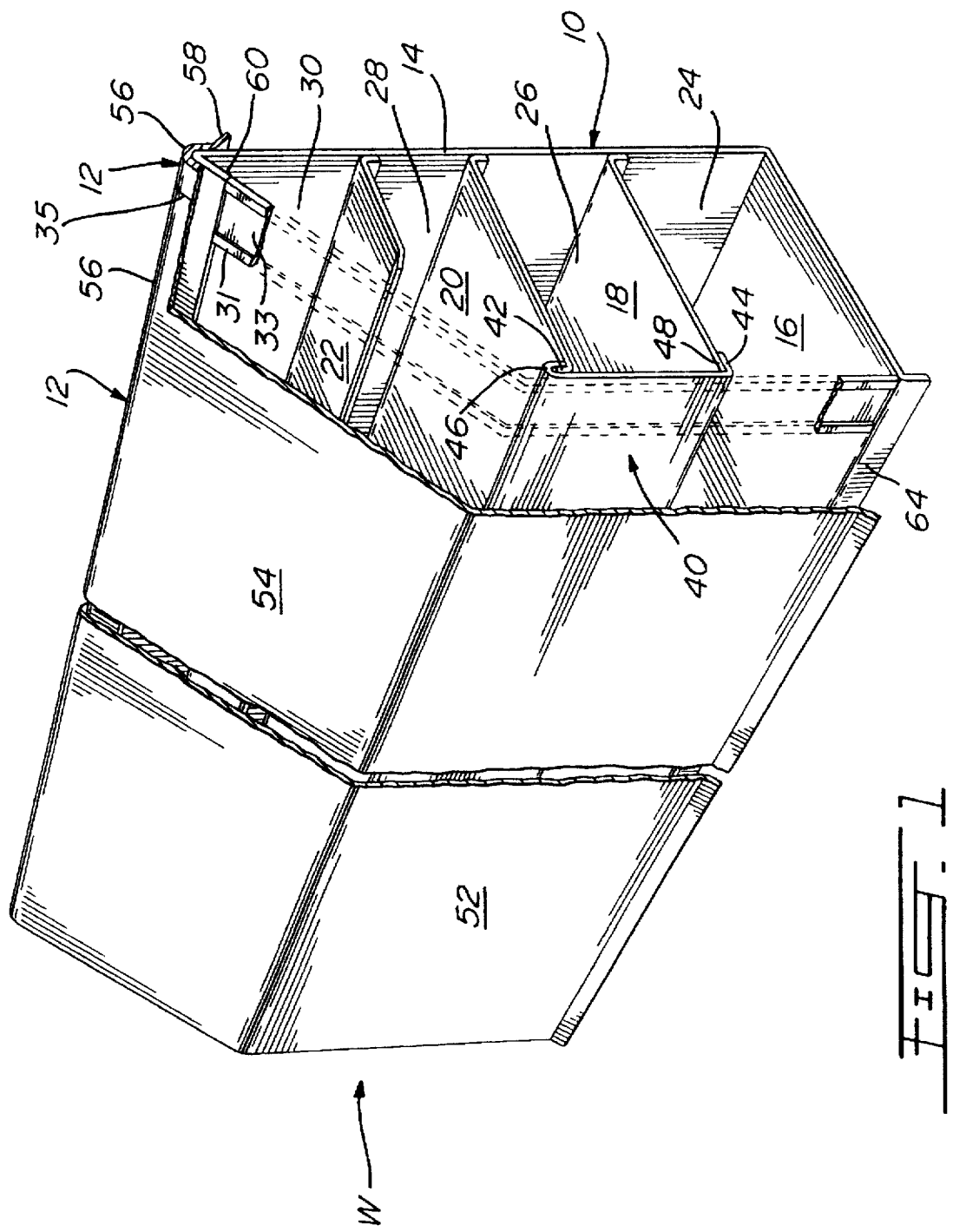

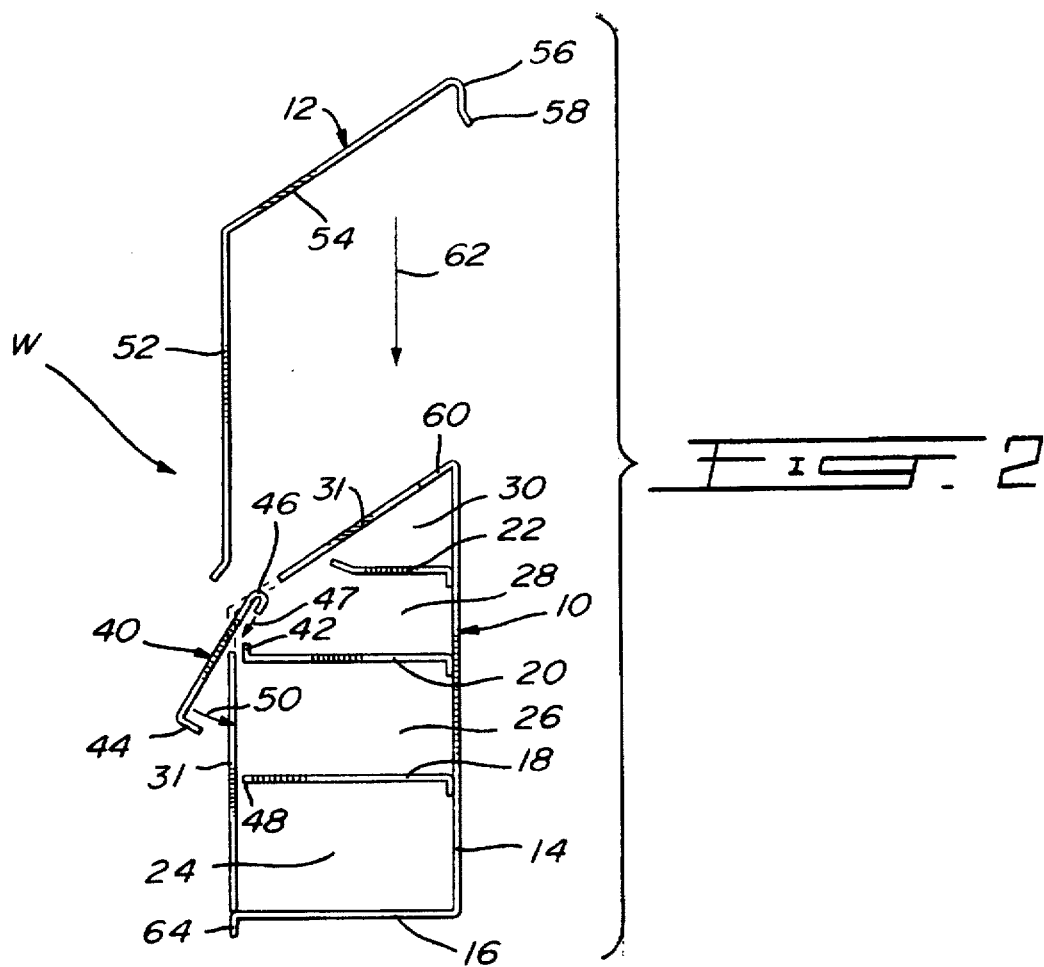
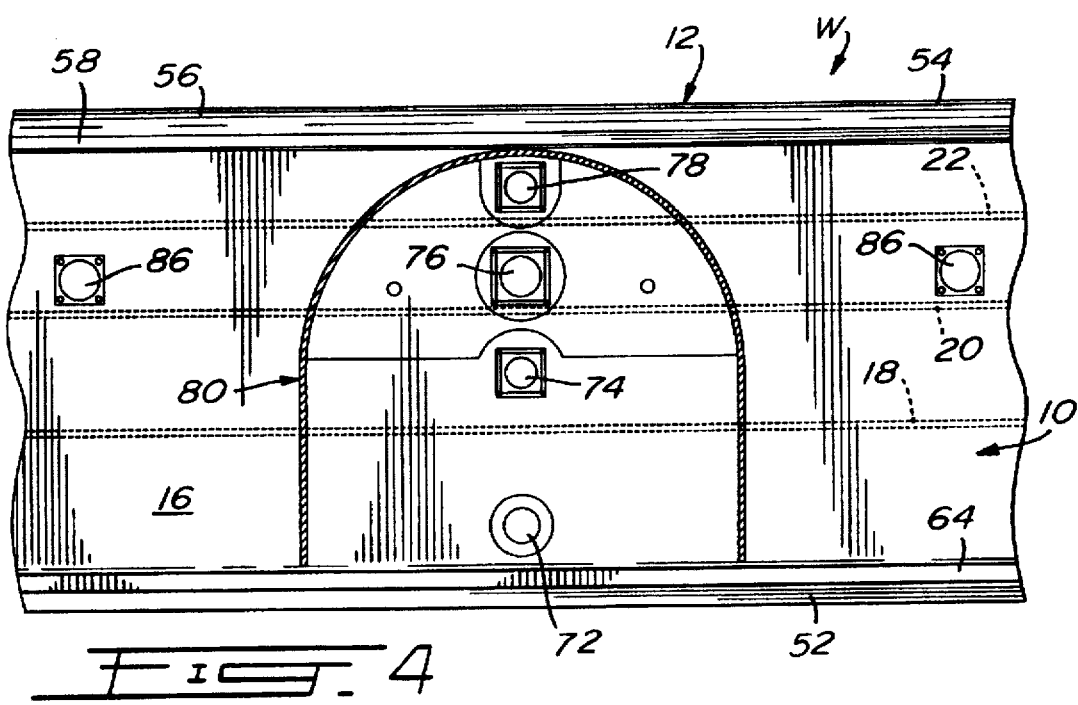

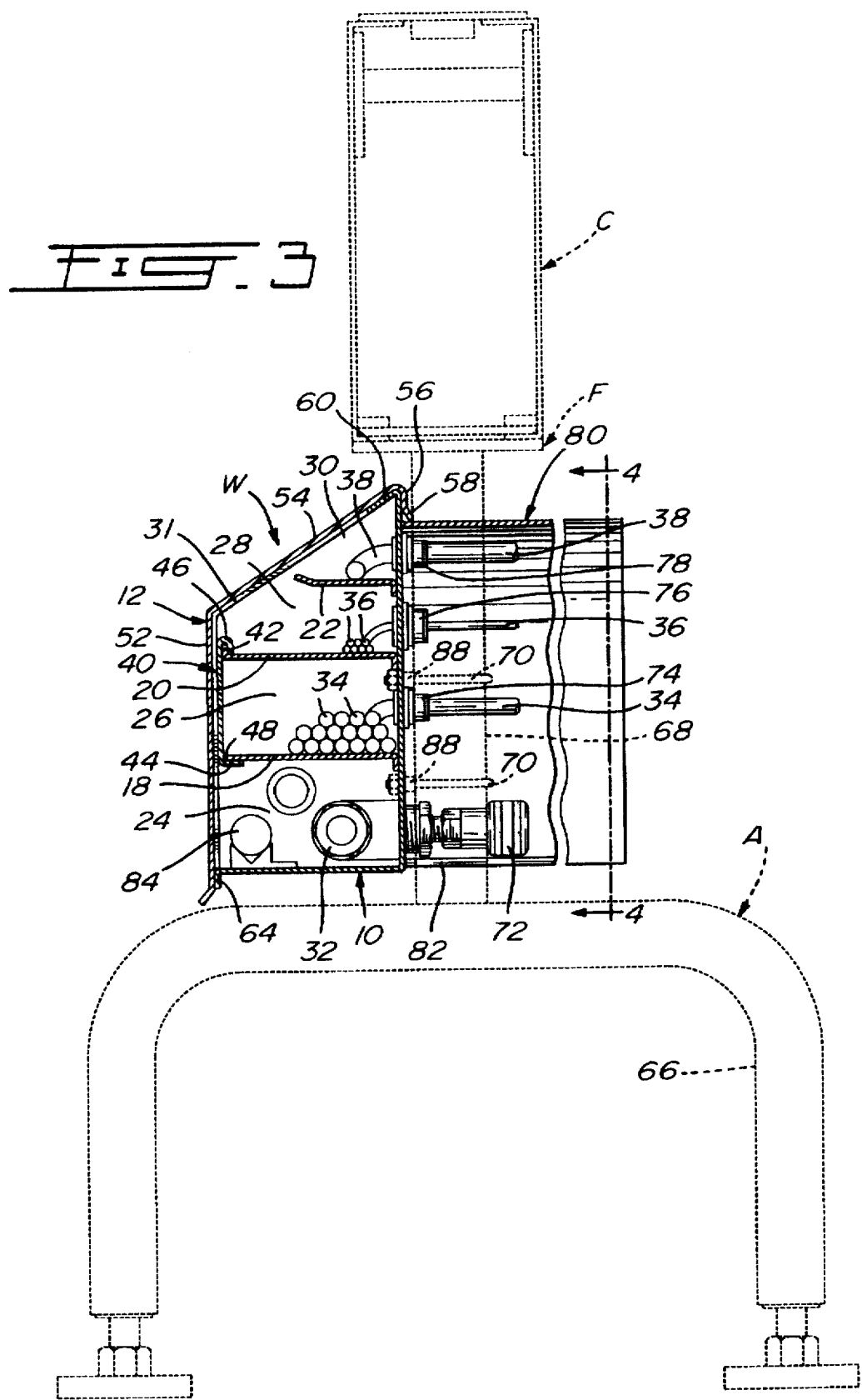

MULTI-CHANNEL RACEWAY FOR ELECTRIC WIRES, CABLES AND OTHER ELONGATED UTILITY LINES

This application is a continuation of application Ser. No. 08/408,835 filed Mar. 23, 1995 now abandoned.

BACKGROUND OF THE INVENTION

1. Field of the Invention

The present invention relates to raceways for supporting electric wires and, more particularly, to a multi-channel raceway adapted to receive various utility lines, such as compressed air lines and different types of electric cables, in a compartmented and substantially insulated installation.

2. Description of the Prior Art

Various wireways have been developed over the years to receive a plurality of cables in various channels. For example, U.S. Pat. No. 5,274,972 issued on Jan. 4, 1994 to Hansen discloses a utility duct comprising a retaining strip 4 adapted to be mounted to a wall structure and a capping 6 removably mounted to the retaining strip. Upper and lower connectors 7 and 8 connect the capping 6 to the retaining strip 4 to form an internal duct passage for the utility members, such as pipes, cables, etc. The retaining strip 4 includes a plurality of supporting horizontal walls or shelves 10, 11, 12 and 13 which together with the retaining strip 4 form gutter-shaped channels for supporting the utility members 2. At least one of the supporting walls (see walls 10 and 13 in FIG. 2) defines an outer end formed as a seat 14a, 14b which seats against the capping 6 when the latter is mounted to the retaining strip by way of the upper and lower connectors 7 and 8. The upper connector 7 is comprised of an upper hollow C-shaped plate 33 provided at an upper end of the retaining strip 4 which defines a clamping space 34 open towards the top for accommodating a bead-shaped ridge 29 provided at a lower end of an upper sealing lip 35. An upper edge 36 of the C-shaped plate 33 forms a locking abutment for a ridge-shaped locking shoulder 38 provided at the upper end of the capping 6. Below the locking shoulder 38, the capping 6 includes a guide plate 39 so that the C-shaped plate 33 can be undergrasped thereby. The lower connector 8 is comprised of a L-shaped supporting plate 20 which extends at the bottom of the retaining strip 4 and which juts out to the floor 19. The L-shaped supporting plate 20 includes a front C-shaped abutment 22 which is adapted to be clasped at the top by a latch clasp 26 which depends from a lower end of the capping 6. The C-shaped abutment 22 defines therein a clamping space 28 which is open towards the floor side and which is adapted to accommodate a bead-shaped ridge 29 of a lower sealing lip 30. A gap 32 is defined above the C-shaped abutment 22 to allow for the passage of the latch clasp 26, as seen in FIG. 2. The capping 6 can thus be connected to the multi-channel retaining strip 4 by way of the upper and lower connectors 7 and 8 with the capping 6 resting against the seats 9 of the retaining strip 4.

U.S. Pat. No. 4,982,536 issued on Jan. 8, 1991 to Muhlethaler discloses a conduit having multiple supports 8 disposed vertically therein for holding several layers of wiring.

U.S. Pat. No. 3,692,920 issued on Sep. 19, 1972 to Santarelli discloses a raceway having a number of vertical layers 3, 4 and 5 for supporting electric conductors of different types which run therethrough. The front cover 8 is removable, as seen in FIG. 6.

U.S. Pat. No. 3,721,762 issued on Mar. 20, 1973 to Gooding discloses an electrical raceway and decorative molding combination which includes a rear retainer clip 10 adapted to be secured to a wall and a removable front cover 11 therefor. The retaining clip 10 and the cover 11 are formed with extrusions which are shaped so as to define a plurality of separate wire receiving channels, such as channels 32, 34 and 38, along the raceway so that different types of wires can run therethrough, such as the power wiring 56 located in the largest channel 34, the telephone cable 57 located in the channel 32 and the antenna wire 58 located in the channel 38.

U.S. Pat. No. 4,216,823 issued on Aug. 12, 1980 to Keldmann teaches a baseboard heating apparatus with cable carrier, wherein a series of elongated wireways 17 extend along the baseboard and include therein electric cables 18.

U.S. Pat. No. 4,145,853 issued on Mar. 27, 1979 to Bridwell discloses an electrical equipment cable trough system provided with internal retaining members defining a cableway.

U.S. Pat. No. 3,551,584 issued on Dec. 29, 1970 to Rose teaches a cable duct having integral horizontal divider partitions 63 formed in the body 61 (see FIG. 4) for defining compartments 64, 65 and 66 which are adapted to receive therein power, intercom and telephone service cables.

U.S. Pat. No. 3,786,171 issued on Jan. 15, 1974 to Shira discloses a wiring raceway 2 somewhat similar to that of afore-described U.S. Patent No. 3,721,762. The raceway 2 defines integral flanges 46 and power cables can be stapled between such flanges 56 while communication wires can be secured above or below the flanges 46 to ensure proper separation of the two types of wires.

U.S. Pat. No. 3,461,220 issued on Aug. 12, 1969 to Hukin discloses a wiring duct including a pair of elongated channel-section ducts 24 which are adapted for supporting continuous leads such as telecommunication wiring separately from the sectionalised wiring 11, as seen in FIG. 3.

U.S. Pat. No. 5,086,194 issued on Feb. 4, 1992 to Bruinsma teaches a trunking assembly for electrical cables, wherein a housing 12 contains various formations within the channel 27, such as fixing rails and compartments intended to separate different cable networks within the trunking, and reference is made to flanges 50 of FIG. 2.

As pharmaceutical companies spend approximately 50% of their manufacturing labor costs on cleaning the equipment between product changes, criteria for a equipment design of a wireway include the absence of crevices, blind corners and seams that could retain product following a spill or the like. Indeed, in such applications, absolutely no leftover product from the previous batch is permissible, whereby the equipment must be easy to clean when there is such a spillage of pharmaceutical product. To a certain degree, the wireway must be capable of being dismantled without tools so that operators may be permitted to more easily perform the cleaning operations. Also, in multi-channel wireways, there must be adequate electrical insulation between the cables of different voltages and preferably access to these cables is maximized to facilitate testing procedures, connections of test loads to connector blocks, etc.

SUMMARY OF THE INVENTION

It is therefore an aim of the present invention to provide a novel multi-channel raceway for electric cables and other elongated utility members.

It is also an aim of the present invention to provide a multi-channel raceway for electric cables comprised of a series of vertically stacked parallel elongated horizontal shelves.

It is a further aim of the present invention to provide a multi-channel raceway for electric wires wherein some shelves are of different depths than others for facilitating access to the electric cables running thereon.

It is a still further aim of the present invention to provide a multi-channel raceway for electric wires which comprises a removable cover having a slanted upper section, wherein the cover includes an upper lip so that the cover can be suspended to a retaining strip defining the various wire receiving compartments.

It is a still further aim of the present invention to provide a multi-channel raceway for electric wires wherein at least one of the various elongated wire receiving compartments is provided with a closure device for denying direct access to the cables running in this compartment even when the cover of the raceway is removed.

It is still a further aim of the present invention to provide a multi-channel raceway for electric cables also comprising a wire cover which extends outwardly of the retaining strip, i.e. opposite the front removable cover, for protecting wires and other utility members entering or exiting the compartments of the wireway.

Therefore, in accordance with the present invention, there is provided a wireway for carrying elongated utility members such as electric cables, airlines and pipes, comprising an elongated retaining strip and an elongated cover means adapted to be detachably mounted to said retaining strip, said retaining strip including at least two substantially horizontal shelf means extend in parallelly in a vertically spaced relation, said shelf means and said retaining strip defining at least two elongated compartment means adapted to receive therein the utility members in a separated and substantially isolated way, said compartment means having an open side so that the utility members extending therein are accessible when said cover means is removed, said open side being closed by sad cover means when in an assembled position with respect to said retaining strip, closure means being adapted to be removably mounted to at least one of said compartment means at said open side thereof for denying direct access to said one compartment means when said cover means is removed from said retaining strip.

Also in accordance with the present invention, there is provided a wireway for carrying elongated utility members such as electric cables, airlines and pipes, comprising an elongated retaining strip and an elongated cover means adapted to be detachably mounted to said retaining strip, said retaining strip including at least two substantially horizontal shelf means extend in parallelly in a vertically spaced relation, said shelf means and said retaining strip defining at least two elongated compartment means adapted to receive therein the utility members in a separated and substantially isolated way, said compartment means having an open side so that the utility members extending therein are accessible when said cover means is removed, said open side being closed by sad cover means when in an assembled position with respect to said retaining strip, said cover means comprising a slanted upper section completely covering said wireway from above said wireway so that substances or the like spilled on said wireway substantially cannot infiltrate said wireway and substantially run off said cover means.

BRIEF DESCRIPTION OF THE DRAWINGS

Having thus generally described the nature of the invention, reference will now be made to the accompanying drawings, showing by way of illustration a preferred embodiment thereof, and in which:

FIG. 1 is a fragmented schematic perspective view of part of a multi-channel raceway for electric cables and other elongated utility members in accordance with the present invention;

FIG. 2 is an exploded end elevational view of the multi-channel raceway of FIG. 1, including a retaining strip, a cover and a closure plate thereof;

FIG. 3 is a partly cross-sectional end elevational view of a conveyor arrangement along container processing stations used in the pharmaceutical industry, the wireway of the present invention being shown installed on the conveyor arrangement for carrying and concealing the various wires and compressed air lines connected to the processing stations thereof; and FIG. 4 is a longitudinal cross-sectional elevational view taken along line 4—4 of FIG. 3.

DESCRIPTION OF THE PREFERRED EMBODIMENTS

In accordance with the present invention, FIG. 1 illustrates a multi-channel wireway W for receiving in distinct elongated compartments a series of electric cables or other elongated utility members, such as pipes, compressed air lines, etc. The wireway W is in the form of a closed elongated stainless steel box which comprises an elongated retaining strip 10 and an elongated protective cover 12 therefor. The retaining strip 10 and the cover 12 of the wireway W can, for instance, be manufactured in lengths of six (6) feet and such wireways W are disposed in abutting longitudinal alignment to obtain a wireway assembly having the required overall length.

The retaining strip 10 comprises a main structure having a L-shaped profile and, more particularly, including a vertical rear wall 14 and a horizontal bottom wall 16 which extends forwardly at right angles from a lower edge of the rear wall 14. A series of elongated horizontal partitions or shelves extend horizontally forwardly in a vertically spaced apart manner from the rear wall 14 above the bottom wall 16 and, in the presently illustrated embodiment, there are shown three (3) such horizontal shelves, that is a bottom shelf 18, an intermediate shelf 20 and a top shelf 22 with the bottom wall 16 acting as an additional shelf. Therefore, the retaining strip 10 defines four horizontally elongated compartments or channels, that is a lower compartment 24 defined between the bottom wall 16 and the bottom shelf 18, a lower intermediate compartment 26 defined between the bottom and middle shelves 18 and 20, an upper intermediate compartment 28 defined between the middle and top shelves 20 and 22, and an upper compartment 30 defined above the top shelf 22 and upwardly delimited by the cover 12.

At least one longitudinal end of each retaining strip 10 includes a band 31 which forms a closed loop with the rear wall 14, the bottom wall 16 and an angular support 60 of the retaining strip 10 (see FIG. 1) and which extends along the inside of the cover 12, as seen in FIG. 3. The band 31 facilitates the longitudinal alignment of the retaining strips 10 and thus of the covers 12. Each band 31 defines a downwardly extending trough 33 and successive covers 12 are positioned in alignment on corresponding retaining strips 10 with a crack 35 defined between the two abutting covers 12 (see FIG. 1) being located opposite the trough 33 so that any amount of a spillage on the wireways W infiltrating in the crack 35 will be lead by the trough towards the floor without reaching any of the compartments 24, 26, 28 and 30. In such a configuration, the covers 12 are slightly offset from the corresponding retaining strips 10.

The bottom wall 16 and the bottom and middle shelves 18 and 20 are all of a same depth, whereas the top shelf 22 is not as deep as the bottom wall 16 and the bottom and middle shelves 18 and 20 in that it does not extend as far forwardly from the rear wall 14 as these other components. All of the compartments 24, 26, 28 and 30 are adapted to receive therein along a generally longitudinal direction thereof one or more cable, of various types, as well as other elongated utility members such as compressed air lines. As illustrated in FIG. 3, a compressed air line 32 extends on the bottom wall 16 and thus through the lower compartment 24. Power cables 34 are supported by the bottom shelf 18 and thus extend in the lower intermediate compartment 26. The middle shelf 20 supports low-voltage I/O and sensor signal cables 36 which thus extend through the upper intermediate compartment 28. The top shelf 22 supports line monitoring system control cables or computer system cables 38 which thus extend in the upper compartment 30.

An elongated vertical closure plate 40 having its longitudinal direction extending horizontally is provided for blocking off a particular Compartment, such as the lower intermediate compartment 26 for concealing, in the illustrated embodiment, the power cables 34. As best seen in FIG. 2, the middle shelf 20 defines a vertically extending front flange 42. The closure plate 40 comprises at the lower end thereof an inwardly projecting horizontal element 44 and at an upper end thereof an inturned lip 46. As seen in FIG. 2, the closure plate 40 is installed as follows. The inturned lip 46 of the closure plate 40 is engaged around the front flange 42 of the middle shelf 20 by lowering along arrow 47 the inturned lip 46 towards the front flange 42 with the closure plate 40 extending at an angle with respect to the vertical so that the lower element 44 thereof completely extends forwardly of a free end 48 of the bottom shelf 18 so that the closure plate 40 can then be pivoted along arrow 50 while the lower element 44 clears the bottom shelf 18 until the lower element 44 of the closure plate 40 underlies the free end 48 of the bottom shelf 18, as seen in FIG. 1. Therefore, the closure plate 40 is removably mounted to the front flange 42 of the middle shelf 20 and to the free end 48 of the bottom shelf 18 so as to, in the illustrated embodiment, further conceal and isolate the power cables 34 running in the lower intermediate compartment 26.

The cover 12 comprises a flat vertical plate-shaped lower section 52 and a flat plate-shaped upper section 54 extending at an angle from the lower section 52. The angle defined by the slanted upper section 54 is possible in view of the staggered arrangement of the middle and top shelves 20 and 22 and, more particularly, in view of the reduced depth of the top shelf 22. The oblique upper surface of the slanted upper section 54 reduces dust accumulation on the protective cover 12 and allows liquids or the like falling on the cover 12 to run off therefrom.

The upper rear free end of the slanted upper section 54 comprises a downwardly extending hook 56 with an angular flange 58 extending downwardly rearwards from a lower end of the hook 56. An upper end of the vertical rear wall 14 of the retaining strip 10 includes the forwardly and downwardly extending angular support hook 60. The angles defined by the hook 56 and the support 60 are similar so that the upper end of the rear wall 14 of the retaining strip 10 becomes engaged in the hook 56 of the protective cover 12 when the latter is lowered as per arrow 62 towards the retaining strip 10, whereby the retaining strip 10 supports the protective cover 12 in the position illustrated in FIG. 1 with a lower end of the vertical lower section 52 of the cover 12 sitting against a vertical flange 64 extending downwardly from a front free end of the bottom wall 16 of the cover 12. In this position, the protective cover 12 completely closes the compartments 24, 26, 28 and 30 defined in the retaining strip 10. The feature of the cover 12 overlapping at the top the retaining strip 10 basically prevents ingress of water and dirt in the wireway W.

With the protective cover 12 in position, as in FIGS. 1 and 3, all of the compartments 24, 26, 28 and 30 are closed on all four sides thereof and this metallic medium surrounding the compartments is desirable especially for absorbing 60Hz electromagnetic radiation that emanates from the power cables 34 and that can sometimes corrupt the weak data signals impressed upon the signal wires 36.

The staggered relationship between the middle and top shelves 20 and 22, that is the difference in depths therebetween, provide easier access to the I/O and sensor signal cables 36 running on the middle shelf 20. This is particularly useful to perform testing procedures, such as connecting test leads to connector blocks mounted in the channels or compartments. Easier access facilitates the cleaning of the cables which is important in pharmaceutical installations.

As illustrated in FIGS. 3 and 4, the present multi-channel wireway W can be used, for instance, on a production assembly, such as on a conveyor arrangement so that the electric cables and compressed air lines connected to processing stations can be mostly concealed in the wireway W with appropriate take-offs being provided at locations where any of these utility members has to be connected to distinct stations or the like of the production assembly.

Mainly with reference to FIG. 3 which shows a typical environment for the present wireway W, a conveyor C is mounted on a conveyor frame F which is supported above the ground surface by a series of spaced apart support assemblies A each including an inverted U-shaped leg 66 and a vertical post 68 extending between the lower leg 66 and the frame F of the conveyor C.

The wireway W is secured to the conveyor C by way of U-bolts 70 which connect the rear wall 14 of the retaining strip 10 to the post 68 of the support assembly A of the conveyor frame F. Various take-offs are provided at appropriate locations on the rear wall 14 of the retaining strip 10 opposite selected ones of the compartments 24, 26, 28 and 30 so that the utility members contained therein can enter or exit the wireway W and be connected to processing stations provided along the conveyor C. FIGS. 3 and 4 illustrate such takes-offs, including an air line connection 72, a power connection 74, and I/O connection 76 and a low-voltage computer communication cable connection 78 which respectively allow for the compressed air line 32, the power cables 34, the I/O wires 36 and the line monitoring system control cables 38 to extend through the rear wall 14 of the retaining strip 10, as well seen in FIG. 3.

The various take-offs or connections 72, 74, 76 and 78 as well as part of the utility members extending therefrom and outwardly of the wireway W are protected by an inverted U-shaped wire cover 80 (in the form of a U-shaped plate) which is secured to the outer surface of the rear wall 14 of the retaining strip 10.

It is noted that reference numeral 82 illustrates an air line adapted for a connection to one or more machines and that reference numeral 84 illustrates a shielded cable.

Reference numerals 86 refer to further take-offs in the form of sensor connections for the sensor cables 36 located in the upper intermediate compartment 28 as these sensor connections 86 must be located typically outside of the wire cover 80 as they must be as close as possible to the respective sensors to which they are connected.

With reference to FIG. 3, the wireway W is located on the operator side of the post 68 and the rear wall 14 thereof is spaced apart from the post 68 on a distance sufficient to receive therebetween the angular flange 58 of the wireway cover 12. This is achieved by spacers 88 which are provided (see FIG. 3) between the rear wall 14 of the retaining strip 10 and the post 68 of the support assembly A of the conveyor C. The protective cover 12 can thus be easily removed by hand, that is without any tools, by using one's fingers to lift the cover 12 by grasping the angular flange 58 thereof.

In an advantageous way, the wireway W of the present invention allows for the rear wall 14 of the retaining strip 10 thereof to be accessed from behind so that there may be provided thereat any required take-off.

Therefore, the present invention provides a wireway W well suited to a pharmaceutical environment. Indeed, the present wireway W shown in a typical conveyor arrangement houses the electric cables and compressed air lines that are required for the proper operation of container processing stations, such as filling stations, counting stations, capping stations, etc., that are located beside the conveyor. Typically by law, the electric cables of different voltages such as power cables and signal cables must be physically separated from one another in the wireway to avoid physical contact and this is achieved by the various metallic shelves 16, 18, 20 and 22 of the present wireway W.

Accordingly, the structure of the present wireway W is a stainless steel multi-channel elongated box in which are placed vertically spaced apart horizontal partitions disposed above one another to form longitudinally extending compartments that can hold electric conductors, i.e. power conductors, signal wires or computer system wires, or even compressed air lines. The partitions or shelves in the upper region of the elongated box or retaining strip 10 are horizontally offset from one another thereby forming a staggered configuration. By virtue of this staggered arrangement between the shelves, the slanted cover 12 can be placed on the retaining strip 10. The oblique surface of the upper section 54 of the cover 12 is desirable for the purpose of avoiding dust and particle accumulation on the wireway W. In addition to this feature, the staggered arrangement, as mentioned hereinabove, defined by the shelves provides easier access to cables disposed in the compartments of the wireway. This is particularly useful to perform testing procedures, such as connecting test leads to connector blocks mounted in the compartments. As connections within the wireway are permissible for control circuits, they can however be a source of trouble, whereby easy access is essential in order that it may be practical to have such internal connections. Furthermore, easier access renders the compartments and the cables located therein easier to clean.

Even though the compartments are easier to access, they are nevertheless individually closed on all sides when the cover 12 is appropriately mounted on the retaining strip 10. Again, such closed compartments prevent radiation emanating from various cables that run through the wireway from corrupting data signals of other wires extending in the wireway.

Therefore, the present individual compartments are easy to access and thus well suited for trouble shooting sensor and control circuits. The compartments are enclosed on all sides by metallic media to reduce electromagnetic interference with the control and computer circuits. The outer configuration of the wireway, i.e. the slanted cover, with overlapping corners and the absence of screw holes practically eliminates the possibility of particle depositions or liquid leaks.

Accordingly, a synergy develops between the staggered shelves and the slanted cover that yields the above benefits. More particularly, the staggered partitions or shelves provide better access to the individual compartments and at the same time, their geometric configuration is such that the mating cover 12 acquires dust shedding properties. The present design thus appears to reconcile too seemingly incompatible objectives, namely better access and protection against dust accumulation on the surface of the wireway in contrast to conventional to wisdom which dictates that better access requires larger compartments which in term increase the size of the wireway and as a result, the entire system would not fit under the conveyor thus exposing it to the full brunt of the inevitable spills of an integrated packaging line.

The additional closure plate 40 which typically is mounted to the bottom and middle shelves 18 and 20 to close the lower intermediate compartment 26 containing the power cables 34 denies direct access to these higher voltage cables 34 when the protective cover 12 is removed. The closure plate 40 further acts as an additional barrier to further electrically insulate the signal cables 36 from the power cables 34, and this even when the cover 12 is removed.

I claim:

1. A wireway for carrying elongated utility members such as electric cables, airlines and pipes, comprising an elongated retaining strip and an elongated cover means detachably mounted to said retaining strip, said retaining strip including at least two substantially horizontal shelf means extending substantially parallelly in a vertically spaced relation, said shelf means within said retaining strip defining at least two elongated compartment means adapted to receive therein the utility members in a separated and substantially isolated way, each said compartment means having an open side so that the utility members extending therein are accessible when said cover means is removed, said open side being closed by said cover means when in an assembled position with respect to said retaining strip, closure means being removably mounted to at least one of said compartment means at said open side thereof such as to selectively substantially close said open side with the utility members of said one compartment means extending on a respective one of said shelf means behind said closure means and being thereby separated from other utility members, wherein said closure means also deny direct access to said one compartment means when said cover means is removed from said retaining strip.

2. A wireway as defined in claim 1, wherein said cover means comprise a slanted upper section completely covering said wireway from above said wireway so that substances or the like spilled on said wireway substantially cannot infiltrate said wireway and substantially run off said cover means.

3. A wireway as defined in claim 2, wherein said cover means comprise at an upper rear end of said slanted upper section a downwardly extending hook means and at a lower front end thereof a substantially vertical panel extending downwardly at least up to a lowermost shelf of said shelf means such to close said open sides of said compartment means, said hook means engaging by gravity an upper end of said retaining strip, whereby said cover means can be upwardly removed from said retaining strip for accessing said compartment means.

4. A wireway as defined in claim 1, wherein said closure means extend substantially along a complete length of said open side of said one compartment means such as to protect, within said wireway, utility members in other compartment means against electromagnetic radiation from utility members of said one compartment means.

5. A wireway for carrying elongated utility members such as electric cables, airlines and pipes an elongated retaining strip and an elongated cover means detachably mounted to said retaining strip, said retaining strip including at least two substantially horizontal shelf means extending substantially parallelly in a vertically spaced relation, said shelf means within said retaining strip defining at least two elongated compartment means adapted to receive therein the utility members in a separated and substantially isolated way, each said compartment means having an open side so that the utility members extending therein are accessible when said cover means is removed, said open side being closed by said cover means when in an assembled position with respect to said retaining strip, closure means being removably mounted to at least one of said compartment means at said open side thereof such that the utility members of said one compartment means extend behind said closure means and on a respective one of said shelf means, whereby said closure means deny direct access to said one compartment means when said cover means is removed from said retaining strip, wherein said closure means comprise a vertical section and an upper inturned lip section an upper shelf of said one compartment means defining an upwardly projecting support means removably engaging said lip section such that said vertical section closes said open side of said one compartment means, said upper shelf extending above said respective one of said shelf means.

6. A wireway as defined in claim 5, wherein said closure means further comprise a lower inward flange adapted to substantially engage an underside of said respective one of said shelf means at a front free end thereof.

7. A wireway for carrying elongated utility members such as electric cables, airlines and pipes, comprising an elongated retaining strip and an elongated cover means detachably mounted to said retaining strip, said retaining strip including at least two substantially horizontal shelf means extending substantially parallelly in a vertically spaced relation, said shelf means within said retaining strip defining at least two elongated compartment means adapted to receive therein the utility members in a separated and substantially isolated way, each said compartment means having a open side so that the utility members extending therein are accessible when said cover means is removed, said open side being closed by said cover means when in an assembled position with respect to said retaining, wherein said retaining strip comprises a rear wall including connection means for allowing outside wire means to be connected to the utility members located in said wireway or to enter said wireway or for allowing any utility member to exit from said wireway, and wherein said wireway further comprises a protective cover extending rearwardly of said rear wall and over said connection means.

8. A wireway for carrying elongated utility members such as electric cables, airlines and pipes, comprising an elongated retaining strip and an elongated cover means detachably mounted to said retaining strip, said retaining strip including at least two substantially horizontal shelf means extending substantially parallelly in a vertically spaced relation, said shelf means within said retaining strip defining at least two elongated compartment means adapted to receive therein the utility members in a separated and substantially isolated way, each said compartment means having an open side so that the utility members extending therein are accessible when said cover means is removed, said open side being closed by said cover means when in an assembled position with respect to said retaining strip, wherein said retaining strip comprises band means extending above and forwardly of said shelf means, said band means defining trough means for collecting an overhead spillage and conveying the same to a lower end of said wireway without reaching said compartment means.

9. A wireway as defined in claim 8, wherein said band means is located opposite an abutment area of two successive cover means disposed in an end-to-end relationship for collecting any substance seeping through a crack defined at said abutment area.

10. A wireway for carrying elongated utility members such as electric cables, airlines and pipes, comprising an elongated retaining strip and an elongated cover means detachably mounted to said retaining strip, said retaining strip including a rear wall and substantially horizontal shelf means thereby defining elongated compartment means adapted to receive therein the utility members, said compartment means having at least one open side so that the utility members extending therein are accessible when said cover means is removed, said open side being closed by said cover means when in an assembled position with respect to said retaining strip, said rear wall comprising connection means for allowing outside wire means to be connected to the utility members located in said wireway or to enter said wireway or for allowing any utility member to exit from said wireway, said wireway further comprising protective cover means extending rearwardly of said rear wall and over said connection means.

11. A wireway as defined in claim 10, wherein said protective cover means has an inverted "U" shape.

12. A wireway for carrying elongated utility members such as electric cables, airlines and pipes, comprising an elongated retaining strip and an elongated cover means detachably mounted to said retaining strip, said retaining strip including wall means and substantially horizontal shelf means extending therefrom thereby defining compartment means adapted to receive the utility members, said compartment means having at least one open side so that the utility member extending therein are accessible when said cover means is removed, said open side being closed by said cover means when in an assembled position with respect to said retaining strip, said retaining strip comprising band means extending above and forwardly of said means and defining trough means for collecting substance seeping through said cover means and conveying the same away from said compartment means.

13. A wireway as defined in claim 12, wherein said band means and said trough means each comprise an upper inclined section located above said compartment means and a lower substantially vertical section located forwardly of said shelf means, whereby said trough mean, is adapted to convey the substances collected thereby to a lower front end of said wireway without reaching said compartment means.

14. A wireway as defined in claim 13, wherein said band means is adapted to be located opposite an abutment area of two successive cover means disposed in an end-to-end relationship for collecting any substance seeping through a crack defined at said abutment area.

* * * * *

UNITED STATES PATENT AND TRADEMARK OFFICE
CERTIFICATE OF CORRECTION

PATENT NO. : 5,704,175

DATED : January 6, 1998

INVENTOR(S) : Graham L. Lewis

It is certified that error appears in the above-identified patent and that said Letters Patent is hereby corrected as shown below:

In column 9, line 6, after "pipes" insert --, comprising--.

In column 9, line 46, "a" should read --an--.

In column 9, line 49, after "retaining" insert --strip--.

In column 10, line 44, "member" should read --members--.

In column 10, line 48, after "said" insert --shelf--.

Signed and Sealed this

Twenty-eighth Day of April, 1998

Attest:

Attesting Officer

BRUCE LEHMAN

Commissioner of Patents and Trademarks